United States Patent

[11] 3,601,809

[72] Inventors Harry J. Gray
Springfield;
Willis K. King, Philadelphia, both of, Pa.

[21] Appl. No. 777,979
[22] Filed Nov. 4, 1968
[45] Patented Aug. 24, 1971
[73] Assignee The Trustees of the University of Pennsylvania
Philadelphia, Pa.
Continuation-in-part of application Ser. No. 723,406, Apr. 2, 1968.

[54] ADDRESSABLE LIST MEMORY SYSTEMS
21 Claims, 11 Drawing Figs.

[52] U.S. Cl. .......... 340/172.5
[51] Int. Cl. .......... G11c 7/00
[50] Field of Search .......... 340/172.5

[56] References Cited

UNITED STATES PATENTS 3,234,524 2/1966 Roth .......... 340/172.5
3,292,152 12/1966 Barton .......... 340/172.5
3,351,913 11/1967 Pine .......... 340/172.5
3,248,708 4/1966 Haynes .......... 340/172.5

OTHER REFERENCES

IBM Technical Disclosure Bulletin, Vol. 9, No. 10, Pg. 1334, 1335, Mar. 1967, " First-in, First-out Buffer Controls"
IBM Technical Disclosure Bulletin, Vol. 9, No. 7, Pg. 826, 827, Dec. 1966, " Dynamic Priority Method for Buffer Stack"

*Primary Examiner*—Paul J. Henon
*Assistant Examiner*—Mark Edward Nusbaum
*Attorney*—Yuter and Fields

ABSTRACT: A memory system includes at least a main list memory. When the memory system is to be accessed for an operation of reading or writing a word, it receives the desired word address. Words are then sequentially transferred from the list memory. As each word is transferred, its address is indicated as available. When a predetermined relationship, such as equality is detected between the desired word address and indicated address, the read or write operation is performed. In the several embodiments of the disclosure, the indicated available address is derived either from a counter or from the contents of the words being transferred. In addition, the various embodiments show the main list memory as either a Last-in First-out (LIFO) type or a First-in First-out (FIFO) type.

ADDRESSABLE LIST MEMORY SYSTEM LM

ADDRESSABLE LIST MEMORY SYSTEM LM

INVENTORS
Harry J. Gray
Willis K. King
BY Yuter & Spiecens
ATTORNEYS

ADDRESSABLE LIST MEMORY SYSTEM LM1

ADDRESSABLE LIST MEMORY SYSTEM LM2

PATENTED AUG 24 1971 3,601,809

ADDRESSABLE LIST MEMORY SYSTEM LM3

ADDRESSABLE LIST MEMORY SYSTEM LM4

ADDRESSABLE LIST MEMORY SYSTEM LM5

FIFO MEMORY FIFOM
ADDRESSABLE LIST MEMORY LM6

ADDRESSABLE LIST MEMORY LM8

ADDRESSABLE LIST MEMORY SYSTEMS

This invention pertains to list type memories which are addressable and is a continuation-in-part of our application Ser. No. 723,406, filed Apr. 23, 1968.

Generally, list memories are not addressable, i.e. particular words in the memory cannot be directly selected, as access to the memory is only through one end of the list structure, whether the list be of the Last-In, First-Out (LIFO) or "push-down" type, or First-In, First-Out (FIFO) type.

In most computer systems addressable memories are virtually essential. Such addressable memories are now obtained by using magnetic core and film matrices, high-speed flip-flop register arrays and magnetic disks and drums.

While such devices satisfy present day requirements, there is a constant need for improved addressable memories. The improvements can be related to size, cost, speed of operation, reliability and the like.

Hardware realizations of list memories are now available which can satisfy these desired improvements.

It is therefore a general object of the invention to provide improved addressable memories for use in data processing and computing systems.

It is another object of the invention to provide an improved addressable memory which utilizes list memory devices.

It is a further object of the invention to provide an improved cost/performance ratio addressable memory having a capacity of orders of magnitude greater than possible at present but with a small increase in cost and effective access time.

Briefly, the invention contemplates a memory system which comprises at least one main list memory capable of storing a plurality of words. Means are provided for indicating a desired word address. Means are provided for sequentially transferring words from and to the list memory. While the words are so transferred, other means indicate the address of each word as it is being transferred. Indicating means indicate when a predetermined relationship exists between the desired word address and the address of the word being transferred so that a read or write operation can then be performed.

Various embodiments of the invention show different realizations as to how the predetermined relationship is mechanized as well as to how capacity can be easily increased and access time further minimized, and the use of LIFO and FIFO type memories for the list memories.

Other objects, the features and advantages of the invention will be apparent from the following detailed description of the invention when read with the accompanying drawings which show, by way of example, and not limitation, various embodiments of the invention.

Before describing the various embodiments of the invention, it is worth noting several general statements. The information being processed is in the form of words of uniform length. Each of the words is preferably a binary-coded combination of bits. Words are processed serially, but the bits of the words are processed and transferred in parallel. The bits are represented by two-state signals. One state represents binary one, the other state represents binary zero. The states can be the presence or absence of a signal, a signal being "high" or "low," a signal having one of two polarities or a signal having one of two unique characteristics. For the sake of simplicity, the presence or absence terminology will be used.

Signals are carried on lines having the same designation as the signals, for example, the WO signals are carried by the WO signal lines. The terminology will be used interchangeably, i.e. either the signal names will be used or the name of the line or lines carrying the signals.

In general, information signals are carried on double-arrowheaded lines, while control signals are carried on single-arrowheaded lines. Quite often and particularly with information signal lines, a single line will be shown. However, this line represents a cable of many lines. For example, the WO signal line is actually a cable of lines wherein each line (or possible a line pair) is associated with one of the bits of an information word. Such a convention should lead to no ambiguity since the context will make readily apparent when the line is a multiconductor cable.

Figure 1:
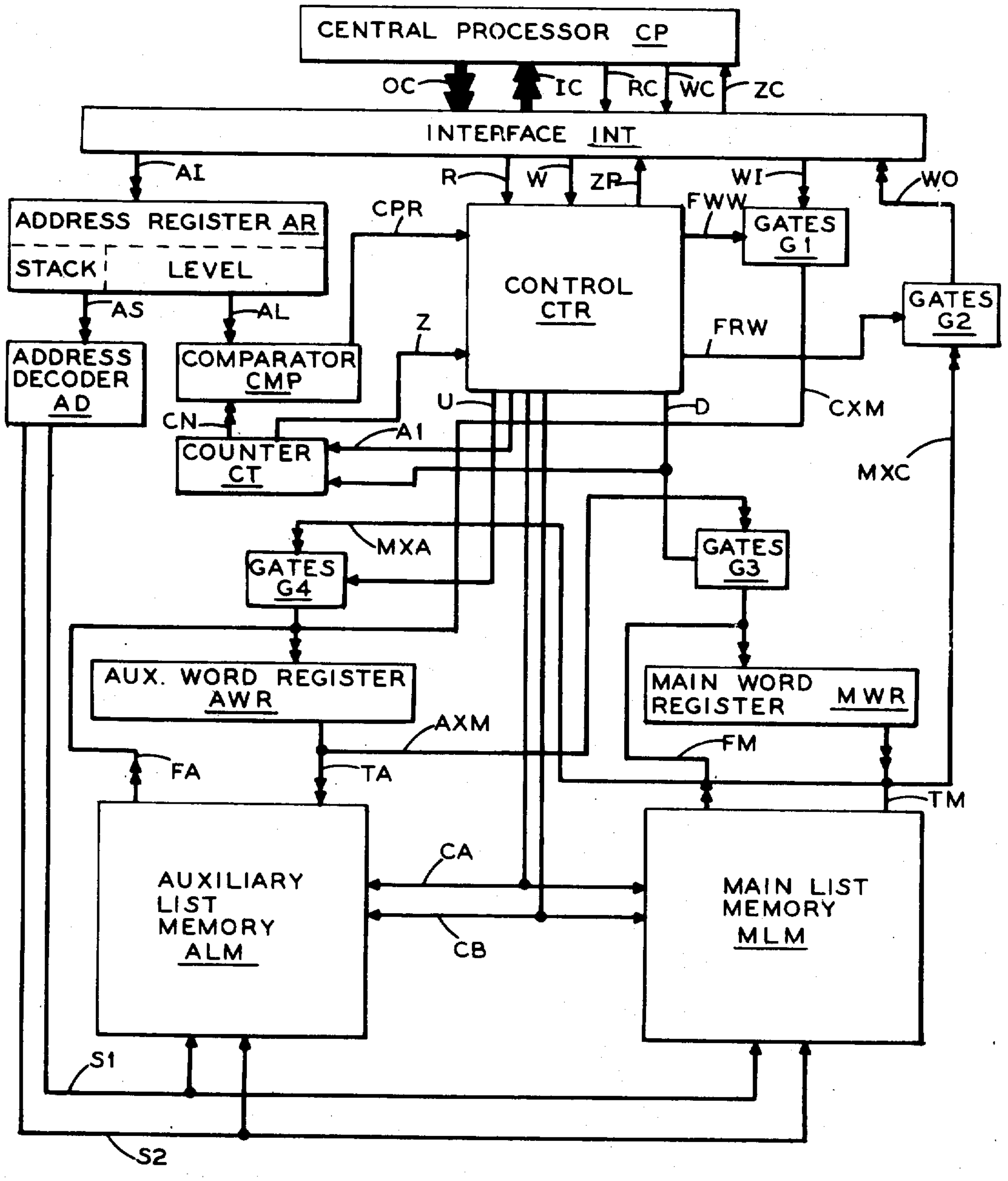
FIG. 1 shows a block diagram of a computer system utilizing an addressable list memory system in accordance with the invention.

FIG. 1 shows a computer system including addressable list memory system LM, hereinafter called a memory system, coupled via interface INT to a central processor CP.

The central processor can be a computing system while the memory system can be a peripheral device or even the working memory of the computing system. The interface INT generally comprises the connections between a data channel of the central processor CP and the memory system LM and for the sake of simplicity will include a word storage register as a temporary store.

The memory system LM centers around a pair of list memories of the LIFO (last-in/first-out) or push-down type and associated access word registers. Functionally, a push-down type list memory is a storage device which works as though it comprises a plurality of word registers arrayed in a column with only the register at the top of the column connected to the rest of the system. When words are serially entered into the list, each word enters in turn the "top register" of the column and is "pushed down" the column from register to register as each subsequent word enters the "top register." As a word is removed from the list ("popped-up" again only from the "top register," each other word stored in the list moves up the column one register. The registers can be visualized as a deck of cards wherein access to the cards of the deck is only possible by adding or removing cards, one at a time, to or from the top of the deck.

The memory system LM comprises sets of push-down type list memories, an auxiliary list memory ALM and a main list memory MLM, hereinafter more fully described. The main list memory MLM includes, by way of example, two push-down lists or stacks. The auxiliary list memory ALM contains only one stack. In order to locate any word in the main list memory MLM, the first part of an address specifies the stack and the second part specifies the level of the word in the stack as the number of registers below the top register of the stack. Returning to the deck of cards analogy, any card in two decks of cards can be specified by stating which deck the card in in (the first part of the address) and how many cards the desired card is below the top card of the deck.

Associated with auxiliary list memory ALM is the one word register AWR which provides the interface between auxiliary list memory ALM and the remainder of the system. Similarly, the main word memory register MWR is associated with main list memory MLM. These registers can be one word flip-flop registers whose previous contents are cleared each time a new word is inserted.

The memory system LM further includes an address register AR which receives a binary coded address word via lines AI from interface INT. The address register AR can be a flip-flop register whose previous contents are changed each time a new address is entered. The register is divided into two parts. One part stores the stack portion of the desired address and the other part of the level portion of the desired address. The stack portion of the desired address is fed via the AS signal lines to address decoder AD.

Address decoder AD can be a conventional decoder which, for each binary coded combination of signals it receives on a plurality of lines at its input, transmits a signal on a different one of a plurality of lines at its output. In the present example, since only two stacks are being used, the stack portion of the address will either be a binary "one" or a binary "zero" requiring only one input signal line. If a binary "zero" is present, a signal will be emitted onto line S1; if a binary "one" is present, a signal will be emitted on line S2. In the usual case more than two stacks are used and the decoder would be more efficient. For example, if ten stacks are used the decoder would be a "binary-to-decimal" decoder.

The second portion of the address register AR, containing the level portion of the desired address, is fed via the AL signal lines to one side of comparator CMP. Comparator CMP can be a parallel binary comparator having two input sides wherein the binary coded combination of signals received at one input side is compared for equality with the binary coded combination of signals received at the other input side. The comparator has a CPR signal present at its output only when an equality is detected. The other side of comparator CMP receives binary coded combinations of signals via lines CN from counter CT.

Counter CT can be an "up-down" binary counter which accumulates a count of pulse signals. When the counter is conditioned to the up state, it unit adds to its accumulated count each time a pulse is received at its input. When the counter is conditioned to the down state, it unit subtracts from its accumulated count each time a pulse is received at its output. At any time, the accumulated count is represented by a binary coded combination of signals on the lines CN. The unit pulses are received on line A1 and the direction-of-count signals are received on line D from control CTR.

Control CTR, hereinafter more fully described, controls the overall operation of the memory system LM during reading and writing operations. The remaining elements are the gates G1, G2, G3 and G4. Each of the gates are parallel arrays of "and" circuits which control the flow of information from their information inputs to their information outputs under control of control signals at their control inputs.

The operation of the computer system of FIG. 1 will now be described. All registers are assumed cleared, auxiliary list memory ALM is cleared and the stacks of main list memory MLM may or may not contain information in some or all of its levels. A record or write operation will be described first, i.e. a word will be stored at a specific level of a specific stack indicated by an address selected by the central processor CP.

In particular, the central processor CP transmits the address word via the lines OC, the interface INT and the A1 signal line to the address register AR. Then, the central processor CP transmits the information word to be stored in the just specified address, via the lines OC to the one word register in the interface INT. Finally, the central processor CP transmits the *a* signal (indicating a write operation) via the WC signal line to the interface INT from which it is transmitted as the W signal to the control CTR. It should be noted that all the signals can be transmitted concurrently. Now the location of the desired address begins.

The stack portion of the address register AR is fed via the AS signal lines to the address decoder Ad which starts generating either the S1 or S2 signal for selecting one of the stacks in the main list memory MLM and for alerting the single stack in the auxiliary list memory ALM. The counter CT is conditioned to count as an up counter by virtue of the absence of the D signal at its control input. The control CTR starts transmitting a U signal to gates G4 to open a path between the output lines of main word register MWR, via lines MXA to the input lines of auxiliary word register AWR. In addition, control CTR starts generating two periodically recurring sets of pulses which are in synchronism. One set of pulses is fed via the A1 signal line to the pulse input of counter CT for incrementing the counter. The other set of the pulses is fed via the CA signal line to both list memories ALM and MLM. The pulses are treated in pairs of an A1 pulse signal and a CA pulse signal. Each CA pulse will cause list memory MLM to be "-popped-up" one level and the "top register" thereof being transferred via the FM signal lines to main word register MWR. Each CA pulse will cause the list memory ALM to be pushed down one level with the transfer of the contents of the auxiliary word register AWR being transferred via the TA signal lines to the "top register" thereof.

Just before each pulse pair of the series is emitted, comparator CMP compares the count (the then available address) of counter CT as represented by the signals on lines CN with the level portion of the desired address as represented by the signals on lines AL. If there is an inequality (indicating the available level is not the desired level) no CPR signal is transferred from counter CT to control CTR.

Whenever a CA pulse is generated, causing list memory MLM to be "popped-up" one level, the contents of its "top register" are transferred via lines FM, main word register MWR, lines MXA and gates G4 to auxiliary words register AWR. Then the CA pulse causes list memory ALM to be "pushed-down" one level with the contents of auxiliary word register AWR (the previous contents of the "top register" of list memory MLM) entering the "top register" of list memory ALM via the TA signal lines.

The next A1 pulse from control CTR increments the count in counter CT by one. Another comparison is performed by comparator CMP and another CA pulse is generated. This pulse results in another transfer of a word from list memory MLM to list memory ALM as just described. These one word transfers and counter incrementings continue until comparator CMP detects an equality (indicating that the desired level has been reached) and transmits a CPR signal to control CTR.

Control CTR transmits a FWW signal which opens gates G1 causing the word stored in the one word register of the interface INT to pass via lines W1 and CXM into word register AWR. At the same time, the U signal goes down and the D signal comes up. The gates G4 are blocked when the U signal goes down. Thus, when the CA pulse, associated with the A1 pulse which caused equality occurs, list memory MLM is "-popped-up" but its contents cannot enter the auxiliary word register AWR. At the same time, the contents of word register AWR (the word to be recorded), just received from interface INT are "pushed-down" into list memory ALM.

Now it is necessary to transfer the contents of the list memory ALM back to list memory MLM. The D signal opens gates G3 establishing a path from auxiliary word register AWR and main word register MWR. In addition, the D signal fed to counter CT causes it to operate as a down counter, performing unit subtractions of the accumulated count each time it receives an A1 pulse signal. Furthermore, the control CT transmits CB pulse signals to the list memories ALM and MLM. Each CB pulse signal causes list memory ALM to be "-popped-up" one level and list memory MLM to be "pushed-down" one level. In other words, the list memories interchange the roles of transmission and reception by virtue of the CB pulses replacing the CA pulses.

Now, when each A1 pulse occurs, counter CT is decremented by one and the associated CB pulse causes the pop-up of list memory ALM and the transfer of the contents of its "top register" via lines FA, auxiliary word register AWR, lines AXM and gates G3 to the main word register MWR. That CB pulse then causes the "push-down" of list memory MLM with the transfer of the contents of word register MWR (just received from the "top register" of list memory ALM) into the "top register" of list memory MLM. These unit decrementings of the counter CT and associated transfers of words from the list memory ALM to list memory MLM occur until counter CT is back to its initial or zero state when it transfers a Z signal to control CTR which stops transmitting A1 pulse signals. The CB pulse signal associated with the last A1 pulse signal occurs and then the CB pulse signals cease. Finally, control CTR transmits a ZP pulse signal to interface INT which signals the central processor CP that the memory system is again accessible.

The read operation wherein the contents of a desired address, specified by the central processor CP, are nondestructively read from memory system LM into the central processor CP is in many ways similar to the above described write operation. Therefore only the differences will be pointed out.

In particular, after the desired address is entered into the address register AR, the central processor CP transmits the RC signal to the interface INT which transmits an R signal to control CTR indicating a read operation. The unit incrementing of the counter CT and the address comparisons begin and continue as before. At the same time, the U signal and CA pulses cause the previously described transfers from list memory MLM to list memory ALM. When equality is sensed by comparator CMP, the CPR signal is again generated. However, now control CTR transmits the FRW signal to gates G2 which open. In addition, the U signal does not immediately cease. When the CA pulse signal associated with the A1 pulse signal which caused the equality detection occurs, the contents of the "top" of list memory MLM are transferred to the "top register" of list memory ALM in the usual manner, and also transferred via lines MXC, gates G2 and lines WO to the one word register in the interface INT. Then the U signal disappears.

The counter CT now starts the counting down and the list memory MLM is restored to its original condition by the transfers from the list memory ALM as described above. When the Z signal is generated by the counter CT, control CTR transmits the ZP pulse signal to the interface which sends the ZC signal to the central processor CP which instructs the processor that the one word register of the interface INT holds the desired word. The processor CP can then take the desired word from the interface via the lines IC.

Although all of the components of the system are well known, it may be instructive to go into greater detail with respect to the list memories and the control CTR.

Figure 2:
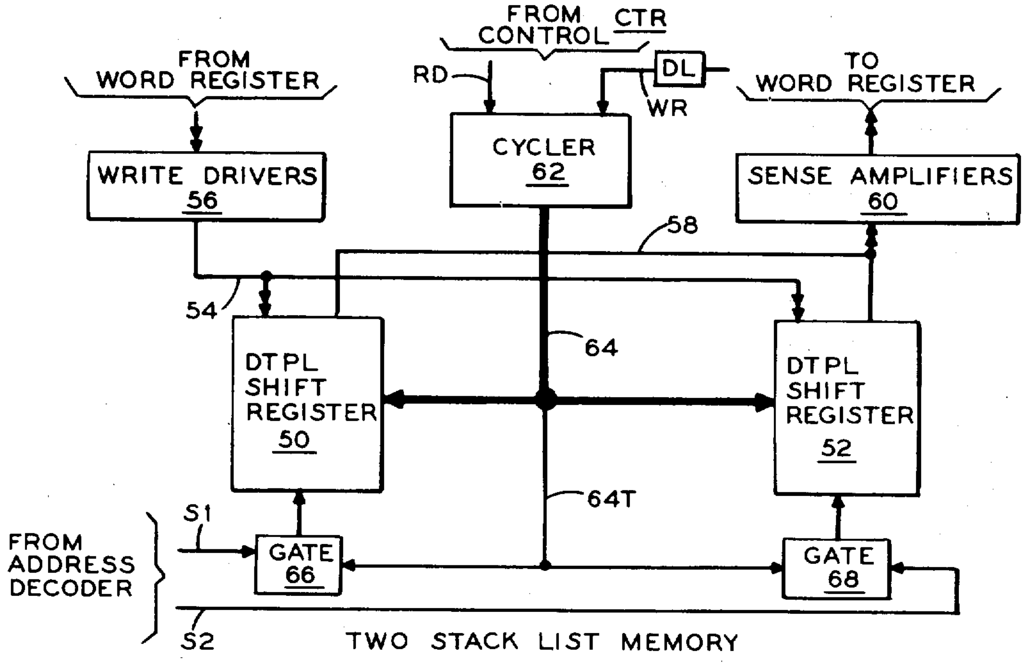
FIG. 2 is a block diagram of a typical push-down list memory of the system of FIG. 1.

In FIG. 2, there is shown a two-stack list memory suitable for use as the main list memory MLM. The list memory comprises the domain tip propagation logic (DTPL) shift registers 50 and 52. While conventional shift registers can be used, DTPL shift registers have many advantages. Such shift registers are described in "DTPL Push Down List Memory" by R. J. Spain, M. J. Marino and H. I. Jauvtis, in AFIPS Conference Proceedings, vol. 30, 1967 Spring Joint Computer Conference, Apr. 18–20, 1967, Atlantic City, New Jersey, Thompson Books, Washington, D.C. (1967), pp. 491–498. For the sake of conciseness, such shift registers will be used and the reader is referred to the cited article for their complete physical description. The "top register" of the shift registers 50 are connected, via lines 54, to write drivers 56, and, via lines 53, to sense amplifiers 60. When words are to be written into a shift register, they pass from the main word register MWR (FIG. 1) via the write drivers 56 into the registers 50 and 52. When words are to be read from a shift register, they pass from the registers 50 and 52, via the sense amplifiers to the main word register MWR. The reading and writing is controlled by by mode pulses from cycler 62. During a write-in operation a pulse on the WR signal line energizes the cycler 62 to transmit a series of pulses via lines 64 to both registers 50 and 52 in order to cycle one of the registers to accept one word from the write drivers. During a read out operation a pulse on the line RD energizes the cycler 62 to transmit a series of pulses via lines 64 to both shift registers to cycle one of the registers to transmit one word to the sense amplifiers. During either operation, cycler 62 transmits a pulse on line 64T to "and" gates 66 and 68. One of the gates will be open by virtue of the presence of either the S1 or S2 signals from the address decoder AD selecting one of the registers (stacks). The passage of the pulse on line 64T through either gate determines which register operates. The series of pulses emitted during the read out and write in operations are shown in FIG. 3 (timing diagram) of the above cited article.

When the two-stack list memory is used for the main list memory MLM the CA signal line from control CTR (FIG. 1) is connected to the RD signal input of cycler 62; and the CB signal line is connected via a delay device to the WR signal input. The delay is to insure that a word is available at the write drivers 56 before a write in cycle begins.

When a one stack list memory is required, as in the case of auxiliary list memory ALM, it is only necessary to delete shift register 52 and gate 68, and connect lines S1 and S2 via an "or" circuit to gate 66. In addition, the CA pulse signal line is connected via the delay device to the WR signal input and the CB signal line is connected to the RD signal input.

Figure 3:
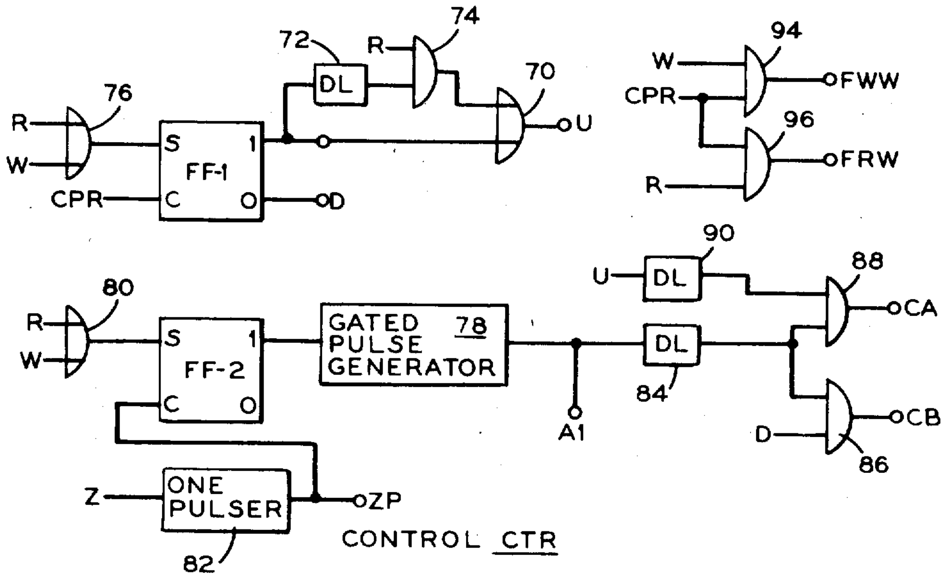
FIG. 3 shows a logic block diagram of the control unit of the memory system portion of FIG. 1.

Although it should be apparent to one skilled in the art how to realize the control CTR in view of the description of its operation, and the sequence of signals it transmits, one possible realization is shown in FIG. 3.

The U and D signals which control the direction of counting by the counter CT (FIG. 1) and direction of information flow between the list memories are generated by the flip-flop FF–1. When the flip-flop is set, the U signal is present, and when the flip-flop is cleared the D signal is present. The D signal is transmitted from the "0" output while the U signal is transmitted from the "1" output of the flip-flop via the "or" circuit 70. It should be noted that the "1" output of the flip-flop is also connected to a second input of the "or" circuit 70 via a delay device 72 and the "and" circuit 74 so that only during a read operation (indicated by R signal input to the "and" circuit 74) the U signal lasts sufficiently long after the equality of addresses is sensed so that the last word read from the main list memory MLM can enter the auxiliary list memory ALM. The flip-flop FF–1 is set at the start of a read or write operation by the occurrence of either the R or W signals fed from interface INT (FIG. 1) via "or" circuit 76 to the set input S of flip-flop FF–1. The flip-flop is cleared by the reception of a CPR signal at its clear input C from the comparator CMP (FIG. 1) when the equality is sensed.

The generation of the A1 pulse signals and the CA and CB pulse signals is performed by the circuitry centered around gated-pulse generator 78. Generator 78 can be a gated free-running multivibrator circuit. The multivibrator runs freely only when a signal is present at its control input. The gating signal is generated by the "1" output of flip-flop FF–2 which is connected to the control input of pulse generator 78. Thus, as long as the flip-flop FF–2 is set, generator 78 emits A1 pulse signals. The flip-flop is set, at the start of a read or write operation, by either R or W signals transmitted from interface INT via "or" circuit 80, to the set input S of flip-flop FF–2. The flip-flop is cleared and the A1 pulse signals end when a Z signal is transmitted from counter CT (indicating it returned to its initial state, via one pulser 82 and the line ZP, to the clear input C of flip-flop FF–2. The one pulser 82 can be a differentiator circuit.

The A1 pulse signals are fed via delay device 84 to an input of each of the "and" circuits 86 and 88. The delay is only long enough to ensure that the CA and CB pulse signals occur after the A1 pulse signals. The second input of "and" circuit 86 receives the D signals so that the CB signals are generated only during the decrementing of the counter CT. The second input of "and" circuit 88 receives the U signal via delay device 90 so that the CA signals occur only during the incrementing of the counter CT.

The FWW signal which controls the transfer of the word to be written from the interface INT to the memory system LM is transmitted from the output of "and" circuit 94 upon the coincidence of the W and CPR signals at the inputs of "and" circuit 94. Similarly, the FRW signal which controls the transfer of the desired word from the memory system to the interface INT is transmitted from the output of "and" circuit 96 upon the coincidence of the W and CPR signals at the two inputs of the "and" circuit 96.

Figure 4:
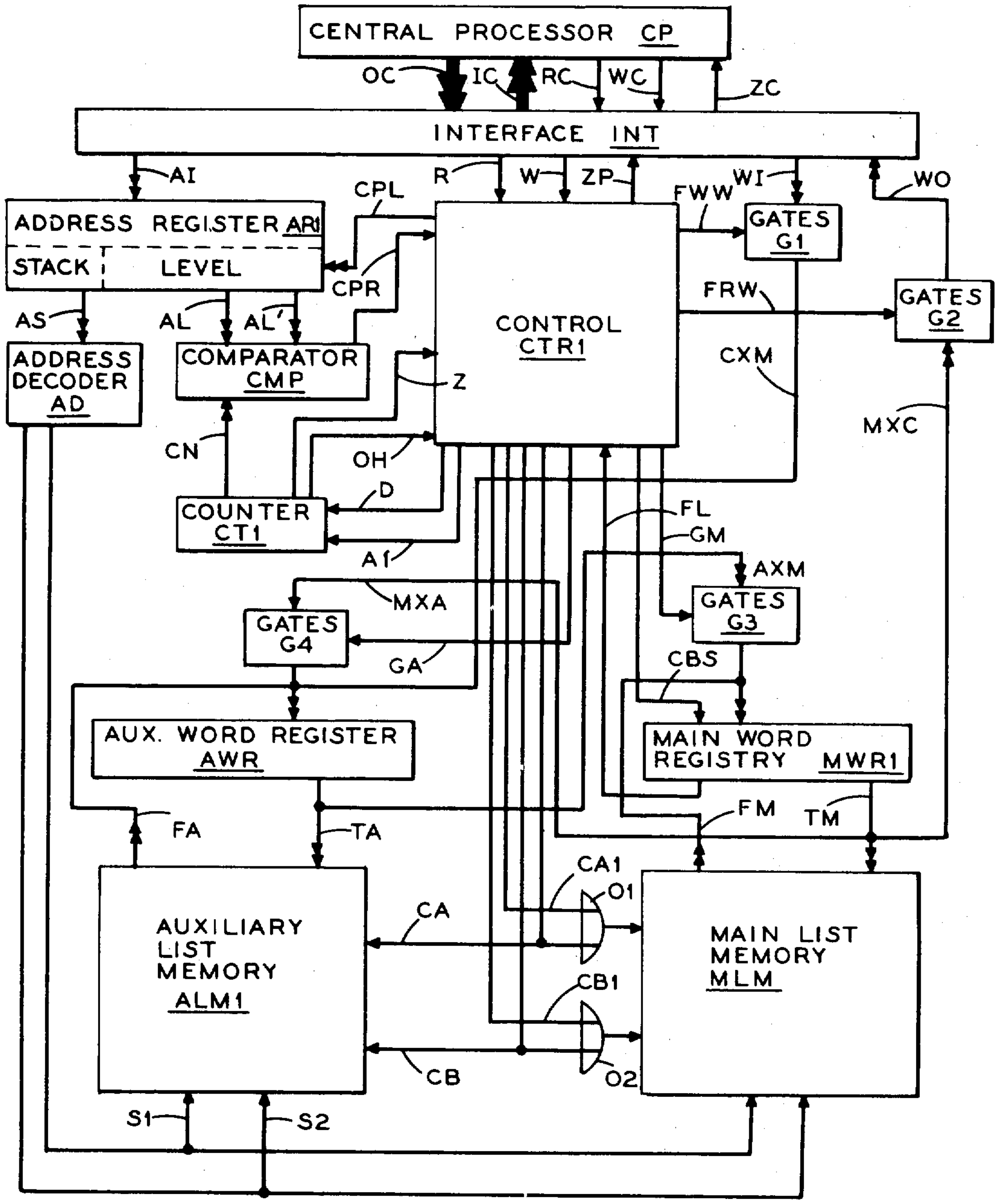
FIG. 4 is a block diagram of a computer system incorporating a faster access memory system according to another embodiment of the invention.

Another embodiment of the computer system is shown in FIG. 4 wherein the addressable list memory system (memory system) LM1 is connected via interface INT with central processor CP. Since the memory system LM1 is in many respects similar to memory system LM of FIG. 1, the same reference characters will be used for identical elements (similar, but not identical elements will bear reference characters suffixed by the numeral 1), and only the differences will be described in detail.

In particular, the level storing portion of the address register AR1 has the facility to transmit signals representing the number of the level or the complement of the numbers of the level, under control of a CPL signal from control CTR1. If the address register is a flip-flop register, it is only necessary to provide gating control at the "1" and "0" outputs of the flip-flops for selecting the number or its complement. The counter CT1 is provided with an output to indicate whenever the number in the counter is greater than half the capacity of the counter. If the counter is a plurality of cascaded binary counter stages, the required output can be from the "1" output stage representing the most-significant bit of the accumulated count. The auxiliary list memory ALM1 has the same number of stacks as the main list memory MLM wherein each stack of list memory ALM1 is paired with a different one of the stacks of the list memory MLM. The main word register MWR1 is provided with a clearing circuit which clears all stages to "0" except the most-significant stage which is set to "1" upon receipt of a signal at a clear input. The control CTR1 is different from control CTR due to the nature and timing of some of the control signals it generates as will be apparent from the description of the operation of the system.

Generally, the operation is similar to that described for the system of FIG. 1, except that each stack of the auxiliary list memory ALM1 is connected in parallel with one of the stacks of the main list memory MLM. Words are accessed in the same way. However, if more than half the words of the selected stack of say the main list memory MLM are transferred to its paired stack in the auxiliary list memory ALM1, before the desired (word) level is reached, instead of returning the transferred words back to the main list memory MLM after the completion of the read or write operation, the remainder of the words in the stack is transferred over to the list memory ALM1. A "flag" is then stored in the "top register" of the accessed stack of the main list memory MLM. The next time this stack is accessed, the "flag" is examined and if present causes the address register AR1 to transmit the level portion of the address in complemented form to the comparator CMP. During the accessing, word transfers flow from auxiliary list memory ALM1 to main list memory MLM. During the transfers from list memory ALM1 to main list memory MLM the same routine is performed so that in a sense there is really no distinction between main and auxiliary list memories except that the list memory MLM stores flag bits.

It should be noted that the access time of this system is half the access time of the system of FIG. 1.

A more detailed description of the operation now follows.

During a read or write operation, the R or W signal from the interface INT (after the loading of the address register AR1 and stack selection in the usual manner) causes control CTR1 to transmit one CA1 pulse signal to main list memory MLM, via "or" circuit 01, where it performs the usual function of a CA pulse signal fed thereto. Accordingly, the "top register" of the selected stack is "popped-up" into main word register MWR1. If no "flag" bit is present, indicating all the words are in the main list memory stack, accessing proceeds as described for the system of FIG. 1, i.e. a GA signal opens gates G4, the A1 pulse signals increment counter CT1 and the CA pulse signals cause the transfer of words from main list memory MLM to auxiliary list memory ALM. If the desired level is found before half the stack is "flipped," the transfer of the word between the interface INT and memory system LM1 (read or write), i.e. an access transfer, is performed and the CA and GA signals terminate and the D, CB and GM signals are generated.

The words are returned to main list memory MLM as described for the system of FIG. 1. The operation terminates with the generation of the Z signal. If the desired level is in the second half of the stack, the counter CT1 transmits an OH signal to control CTR1 when the halfway point is reached. When the desired level is found, the access transfer is performed as usual. However, the OH signal causes the control CTR1 to continue generating CA and GA signals and to not generate the D, CB and GM signals. Thus, the counter CTR1 still counts in the up direction and word transfers are still performed from the list memory MLM to auxiliary memory ALM1. This occurs until the Z signal is transmitted from counter CT1 to control CTR1. It will be recalled that the Z signal occurs when the counter has a count of zero. Therefore, if the counter is a module $n$ counter, where $n$ is the number of levels available for word storage in a stack, the Z signal will indicate when all words have been restored to their initial stack or when all words have been transferred from their initial stack.

Before the Z signal terminates the operation, by virtue of the previously generated OH signal, it causes the generation of a CBS pulse which clears main word register MWR1 so that only a "1" is stored in the most-significant bit position of the register. In addition, a CB1 signal is transmitted by control CTR1, which passes via "or" circuit O2 into list memory MLM to perform the role of a CB pulse, i.e. write into the "top register" of the selected stack thereof the contents of main word register MWR1. Thus, the "flag" bit is stored.

Now assume, during a read or write operation, the CA1 pulse signal causes the transfer of a word from the "top register" of main list memory MLM to word register MWR1 which has a flag bit. In such a case, the control CTR1 will receive an FL signal from the word register MWR1. Control CTR1 transmits a CPL signal to address register AR1 and the complement of the level portion of the address is fed, via lines AL' to comparator CMP. Control CTR1 in this case then starts generating A1 and CB pulse signals and a GM signal which opens gates G3. Counter CT1 is incremented by the A1 pulse signals while the CB pulse signals cause word transfers from list memory ALM1 to list memory MLM in the usual manner. If the desired word is obtained before half the list is transferred, the CPR signal from the comparator CMP initiates the access transfer (read or write) and causes the cessation of the CB pulse signals, and starts the generation of the CA pulse signals and the GA and D signals. The counter CTR1 starts decrementing and words are transferred from list memory MLM to list memory ALM1. This continues until the Z signal is generated. The Z signal now, by virtue of the fact that no OH signal was generated and an FL signal was generated at the start of the operation, causes the generation of a CBS pulse signal and a CB1 pulse signal. A flag bit is recorded in the "top register" of the selected stack of list memory MLM in the manner described above.

If the memory "strike" occurs after half the words are transferred, the OH signal generated at the halfway point cooperates with the CPR signal to cause the continuation of the generation of the CB pulse signals and the TM signal (no D signal, nor GA signal nor CA pulse signals are generated). Word transfers continue from list memory ALM1 to main list memory MLM and counter CT1 still increments until the Z signal is generated, terminating the operation. Since the FL signal was sensed at the start of the operation and since the OH signal occurred during the incrementing, no CBS pulse signal is generated but a CB1 signal is generated. The operation ends with the words in the selected stack of main memory MLM and no flag bit stored in the "top register" thereof.

The details of control CTR1 will not be described since it should be apparent to those skilled in the art from a description of the required signals and their timing that such a control can be readily built following the teachings and techniques employed in FIG. 3.

Figure 5:
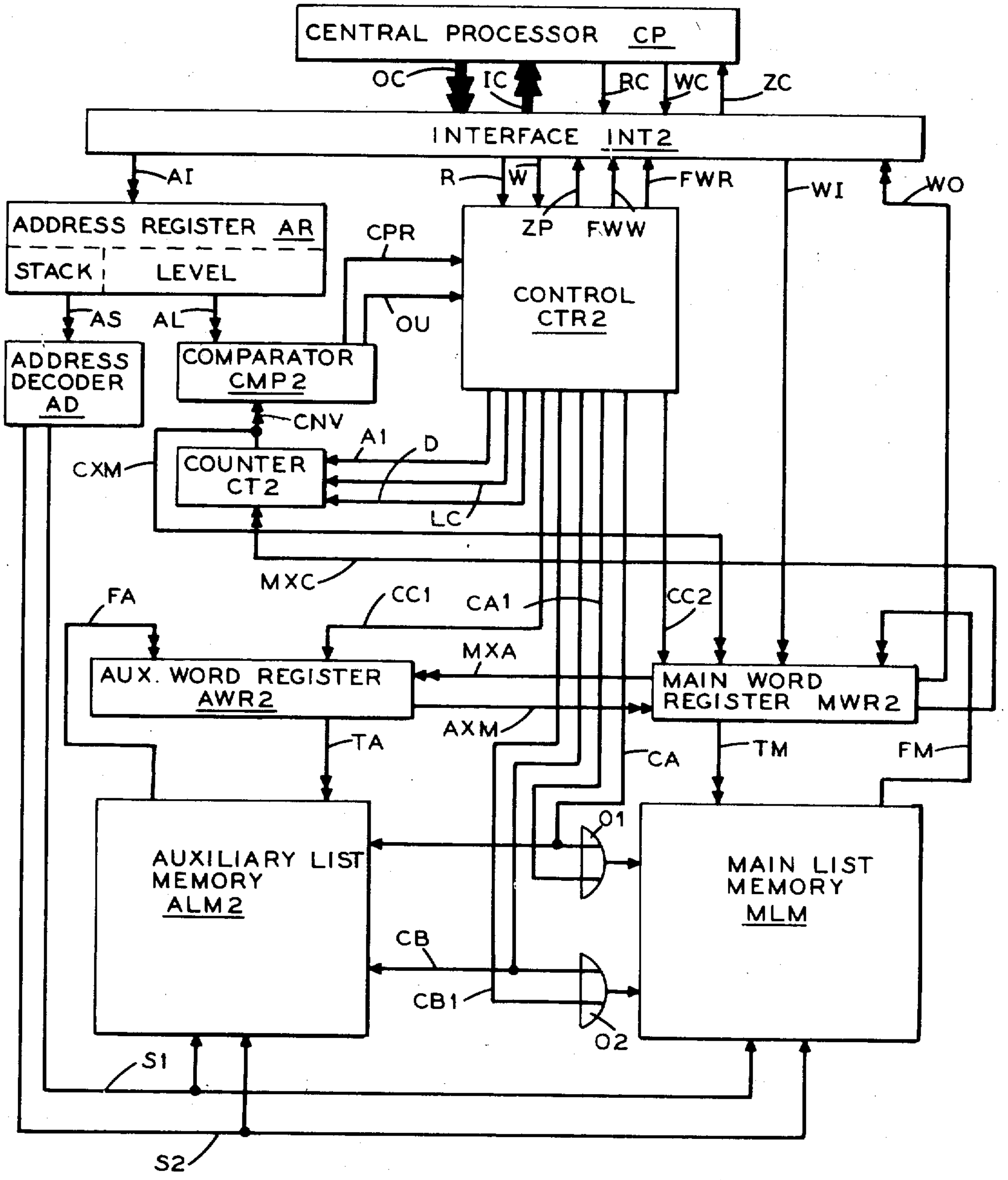
FIG. 5 is a computer system incorporating a still faster access memory system according to yet another embodiment of the invention.

A variation of the embodiment of the computer system of FIG. 4 is shown in FIG. 5 wherein the addressable list memory system (memory system) LM2 is connected via interface INT2 with central processor CP.

Again, memory system LM2 is in many respects similar to memory systems LM and LM1. Therefore, the same reference characters will indicate identical elements; similar, but not identical elements, will bear reference characters suffixed by the numeral 2. Furthermore, only the differences will be described in detail. However, in order to simplify the drawing, several changes in format are employed. In particular, the number of distinct control signal lines is minimized by incorporating several such lines in a single lead, representing a cable (see leads CC1 and CC2, representing control cables). Furthermore, gates G1 to G4 of FIGS. 1 and 4 are not shown but assumed to be included in their logical related units as will become apparent.

Now refer to the elements: List memory ALM2 is identical with list memory ALM1. Interface INT 2 is the same as interface INT except that it includes gates G1 and G2. Auxiliary word register AWR2 is the same as auxiliary word register AWR, except that it includes gates G4; and main word register MWR2 is the same as main word register MWR, except that it includes gates G3. Counter CT2 is a presettable up-down counter. The prime difference in the system is in comparator CMP2 which can indicate not only equality but also the sense of an inequality. Of course, the composition of control CTR2 will vary slightly from the previously described controls since it is required to respond differently to comparator CMP2.

Fundamentally, the operation of addressable memory system LM2 is the same as addressable memory system LM1 with one difference. After a read or write access has occurred, instead of continuing level counting in the counter CT2 while transferring the remainder of the words into an auxiliary or main list memory stack, as the case may be, and the recording the "flag" bit in the selected stack of main list memory MLM, word transfers cease and counting stops in the counter, and the count value is transferred to the "top register" of the selected stack on the main list memory. When this stack is again accessed, the stored count value is loaded into the counter CT2 and compared with the level value stored in address register AR by comparator CMP2 which indicates whether the levels are equal, and, if unequal, the direction of inequality. If the desired level has a value greater than the count value counter CT2 unit increments while words are transferred from main list memory MLM to auxiliary list memory ALM2. If the opposite inequality is sensed, counter CT2 unit decrements while words are transferred from auxiliary list memory ALM2 to main list memory MLM. This continues until equality is sensed, indicating the desired level has been located.

More particularly, during a read or write operation, the R or W signal from interface INT2 causes control CTR2 to transmit one CA1 pulse to main list memory MLM and an LC signal to counter CT2. The contents of the "top register" of the selected stack (the count number of the first level available for access transfer in the main list memory) is transferred via the lines FM, main word register MWR2 and lines MXC to counter CT2 under control of the LC signal which opens gates thereto. The absence of gating control signals in the cables CC1 and CC2 prevent transfers between the word registers at this time.

Comparator CMP2 compares the available level value represented by signals on the CNV lines with the desired level value, represented by signals signals on the AL signal lines from the level portion of address register AR.

Three cases arise: (1) The level values are equal; (2) the desired level value is greater than the available level value; and (3) the desired level value is less than the available level value. Each case will be treated separately.

Case (1). Comparator CMP2 transmits a CPR signal to control CTR2 which emits either a FWW or FEW signal to interface INT2, depending on whether a write or read operation is being performed, to open gates between the storage register therein and either the WI or WO signal lines. A CB or CA pulse signal is generated by control CTR2 to pop up or push down the selected stack of main list memory MLM. A word is either read out via lines FM, main word register MWR2 and lines W0 to interface INT2, or a word is written in from interface INT2, via lines W1, main word register MWR2 and lines TM. The control CTR2 emits one CB1 pulse and a control signal on one of the lines in cable CC2 to cause the transfer of the contents of counter CT2 via the lines CXM, word register MWR2 and lines TM into the "top register" of the selected stack of main list memory MLM. Finally, control CTR2 transmits a ZP signal to interface INT2 indicating the end of the access transfer operation.

Case (2). After the contents of the "top register" of the selected stack of main memory MLM is read into counter CT2, as described above, no CPR signal is generated nor is an OU signal generated. Therefore, control CTR2 starts generating A1 pulse signals, CA pulse signals and gating control signals on lines CC1 (to open a path between main word register MWR2 to word register AWR2). Counter CT2 is unit incremented and words are transferred from list memory MLM, via the lines FM, main word register MWR2, lines MXA, auxiliary word register AWR2 and lines TA into auxiliary list memory ALM2. This continues until equality is sensed and the routine continues as in case (1)

Case (3). The contents of the "top register" of the selected stack of main list memory MLM are read into counter CT2 in the usual manner. Since the desired level value is less than the available level value no CPR signal is generated but an OU signal is transmitted from comparator CMP2 to control CTR2. Control CTR2 transmits: a D signal to counter CT2 which is conditioned to count as a down counter; a signal on one of the lines of cable CC2 to open a path from auxiliary word register AWR2 to main word register MWR2; A1 pulse signals to counter CT2 for unit decrementing of the count therein; and CB pulse signals to the list memories to cause popping-up of auxiliary list memory ALM2 and pushing-down of main list memory MLM. For each unit decrement of counter CT2 a word is transferred from auxiliary list memory ALM2 via the FA signal lines, auxiliary word register AWR2, lines AXM, main word register MWR2 and lines TM, to main list memory MLM. This continues until equality is sensed by comparator CMP2 and the Case (1) routing takes over.

Figure 6:
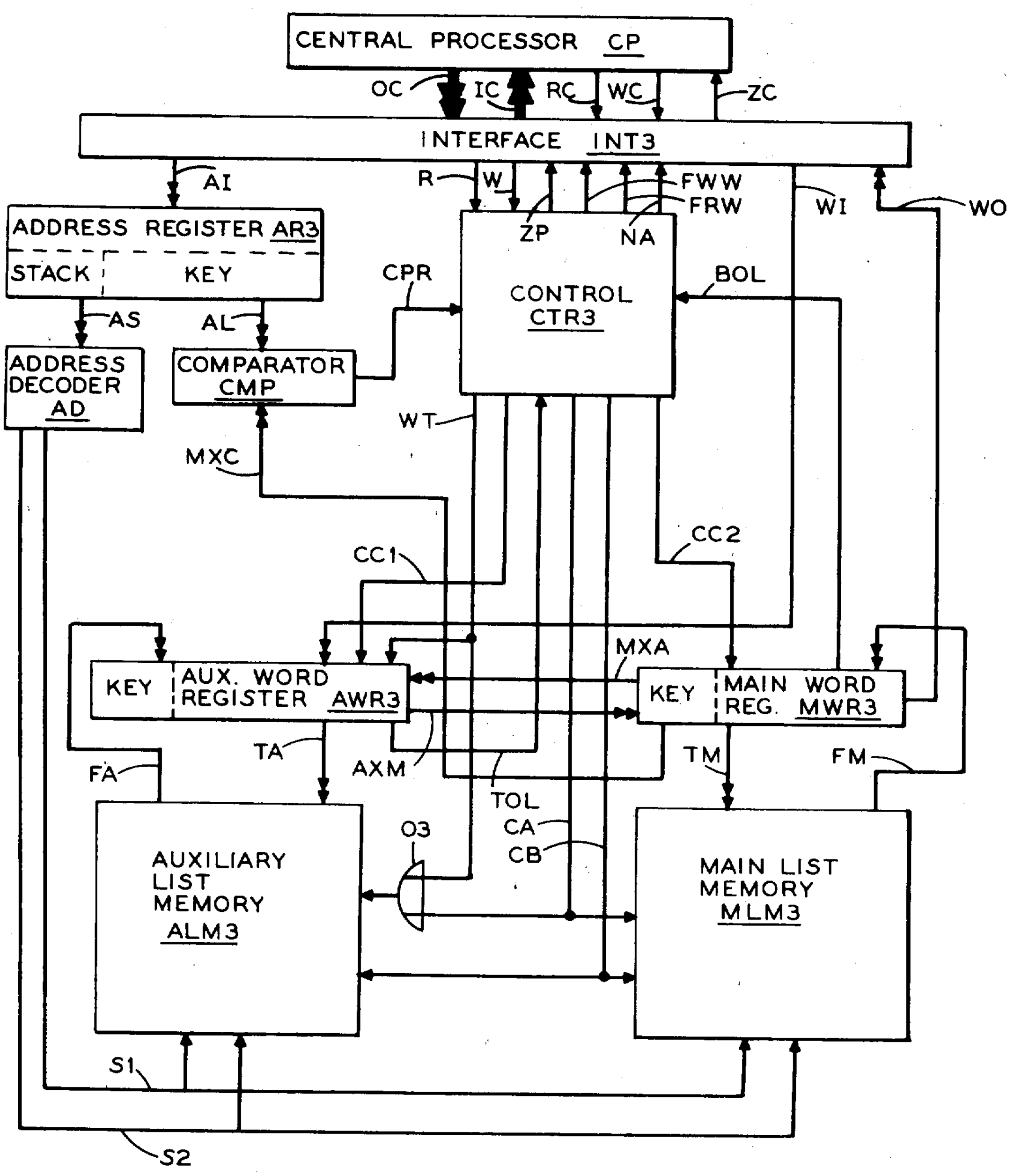
FIG. 6 is a computer system incorporating a content addressable memory system according to still another embodiment of the invention.

In FIG. 6 there is shown a contents addressable embodiment of the invention. The computer system of FIG. 6 comprises a central processor CP connected via interface INT3 to the addressable list memory system LM3, hereinafter called memory system LM3.

Memory system LM3 is most similar to memory system LM of FIG. 1. Therefore, the same reference characters will indicate identical elements; similar, but not identical elements will bear reference characters suffixed by the numeral 3. Furthermore, only the differences will be described in detail. Again, to simplify the drawing, the format changes employed in FIG. 5 are carried over in FIG. 6, i.e., the minimizing of distinct control leads and the inclusion of the gates G1 to G4 in their logically associated elements.

In particular, interface INT3 is identical to interface INT2 in that it includes gates G1 and G2. Auxiliary word register AWR3 includes gates G4 and main word register MWR3 includes gates G3.

The fundamental difference is that memory system LM3 is content addressable while memory system LM is position addressable. A position or location addressable memory is one wherein words are accessed by indicating the word's position in the memory. A content addressable memory is one wherein words are accessed by indicating a "dog tag" or piece of information included in or associated with the word. This piece of information is often called a key.

In a position addressable memory such as memory system LM the desired address is specified by a stack number and a level number in the stack, in the content addressable memory, the desired address is specified by a stack number and a key.

Therefore, address register AR3 has a stack portion and a key portion. There is no level number in the address, so there is no need for a counter. Instead the comparator CMP compares the desired key with "available" keys that were previously written. Now each word in the memory has associated with it a key. Accordingly, each of the shift registers in the stacks includes extra bit positions for holding the keys in parallel with the associated words. As will hereinafter become apparent, still further bit positions are provided for flags. In other words, each word now includes a data portion, a key portion and a flag portion. Hereinafter, unless otherwise specified, a word will imply all portion. Therefore, the auxiliary word register AWR3 and main word register MWR3 are expanded to handle all three portions.

With this in mind, the differences in the operation of memory system LM3 with respect to memory system LM will be described. In fact, the prime difference is that during a read or write operation, as a word is read from main list memory MLM3 for transfer to auxiliary list memory ALM3, its key portion is also transferred from main word register MWR3 via lines MXC to comparator CMP where it is compared with the desired key from the key portion of address register AR3. These transfers and comparisons continue until equality is sensed as indicated by the transmission of a CPR signal from comparator CMP to control CTR3. The read or write operation then occurs and the words in auxiliary memory ALM3 are returned to main list memory MLM3 (memory MLM3 is restored to its initial condition) just as was described for the memory system LM of FIG. 1. However, there is a further refinement.

It is necessary to know, during a read or write operation, if the bottom of a list is reached while seeking the desired word to indicate to the processor CP that the word does not exist in the selected stack, if in fact it doesn't. Therefore, there is associated with each stack an extra column which stores a "bottom of list flag" in the last available level. Hence, if during word transfers from main list memory MLM3 to auxiliary list memory ALM3, the entire stack is searched without finding the desired key, the last available level is reached and a BOL signal is transferred from main word register MWR3 to control CTR3. Control CTR3 transmits a (not available) NA signal to interface INT3 and starts the restoring of the words into main list memory MLM3.

It also should be apparent that the system must know when a restoring routine is complete, i.e. when all the words that were transferred to auxiliary memory ALM3 are returned to main list memory MLM3. Therefore, at least the stack of the auxiliary list memory ALM includes a further bit position which is used to store a "top of list" flag bit. Only the "top register" of the list memory ALM3 when empty, carries this flag bit. It is inserted by the WT signal pulse from control CTR3 at the start of each read or write operation. The WT signal enters word register AWR3 where it clears all bit positions but the ±top of list" flag bit position which is set to 1. .The WT signal then passes through "or" circuit O3 where it acts as a CA pulse signal to initiate one write-in cycle of auxiliary list memory ALM3.

During the restore routine when the word containing this "top of list" flag is read out, auxiliary word register AWR3 transmits a TOL signal to control CTR3 which then terminates the operation.

It should be noted that the key portion of the word can be considered part of the address of that word. However, the memory system can be made more flexible if it operates in a manner slightly different from what is described viz that the key portion of an address is written into the memory together with the data portion when the word is entered into the memory. There are two variations of this operation mode.

Figure 7:
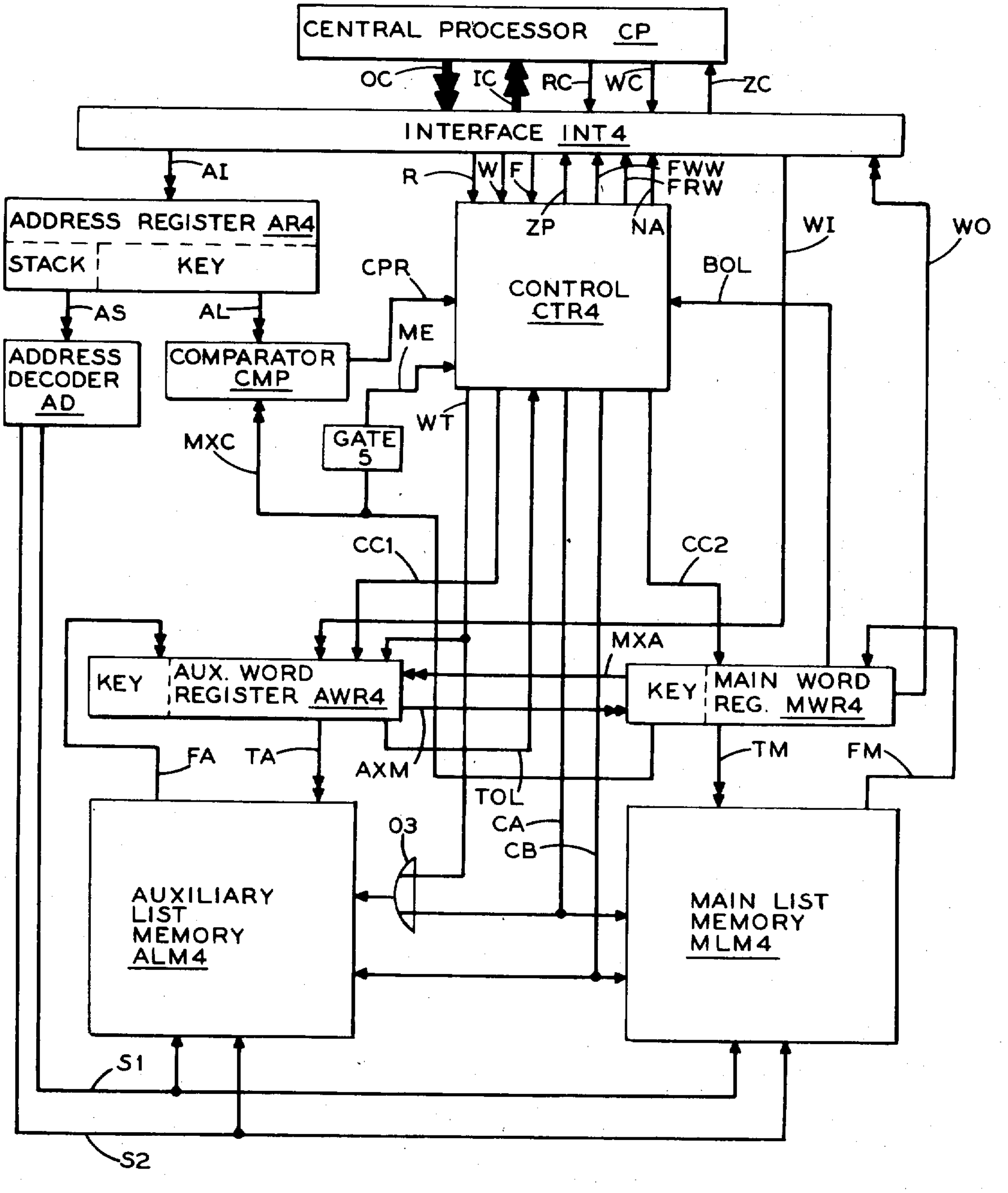
FIG. 7 is a computer system incorporating a contents addressable memory wherein the key words are stored with the data.

1. With destructive write. The system shown in FIG. 7 is essentially similar to the system LM3 except that the signals MXC coming from the key portion of the MWR4 are also led to an "And" gate which would generate a pulse ME when all the bits of the signal lines MXC are zero. All the bits equal to zero in the key portion of an address does not constitute a "legal" address and if all the bits in the key portion of a word in the memory are zero, it indicates that this particular unit of storage space is empty and not in use. The read operation of this system is exactly the same as in LM3. The write operation is also similar to that in LM3 except that now it can happen that instead of getting a signal CPR the control receives an ME signal indicating that the word to be entered into the memory has not been written into the memory previously and an empty spaced is now found in the list. The word is then entered into the memory together with its key in the same way as the write operation in LM3. The words in auxiliary memory ALM4 are also returned to the main list memory MLM4 just as in LM3.

There is also an extra feature in this system. It is an operation called fetch (destructive read). The operation is similar to read except that instead of an R signal, an F signal is sent to the control CTR4. The test for equivalence of the key is also the same as the read operation in LM3. However, when coincidence is detected, Gate 4 remains closed preventing the information from going into the auxiliary list memory ALM4. Now, when the words in the auxiliary list memory are returned to the main list memory the word being fetched is no longer there. In other words, the word has been erased and a memory spaced has been set free for other data.

Figure 8:
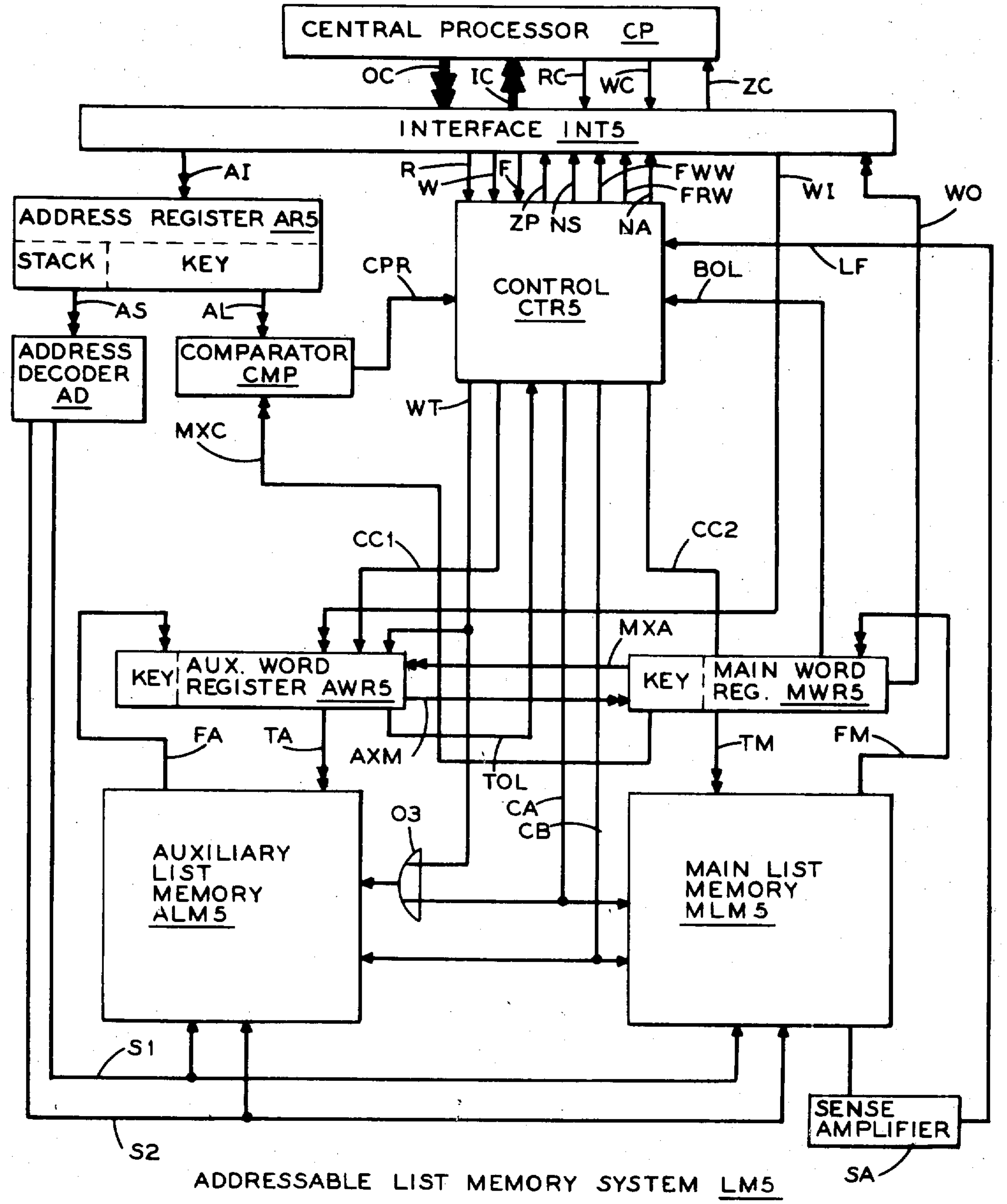
FIG. 8 is a variation of the system of FIG. 7.

2. With nondestructive write. FIG. 8 shows the system. It is essentially similar to LM4 except that the BOL signal is sensed at both ends of the Main List Memory. When the signal bit is sensed at the top of the list it indicates bottom of the list as it is explained in system LM3. However, when it is sensed at the other end of the list memory, it indicates that the list is full except for a reserved level at the very bottom. The use of this reserved level will be explained later.

The read and fetch operations are exactly the same as system LM4. The write operation, however, is executed differently. Here, the comparator is not used. As soon as the control CTR5 receives the W signal, it would open Gate 4 and let the word together with its key enter the auxiliary word register AWR5 without going into the search routine for the key. Then the CB pulse is generated and the word is pushed down into the main list memory. If the list happens to be already full the "bottom of the list" flag will be sensed by the sense amplifier SA and an LF signal will be generated and sent to the control CTR5. The word which was in the bottom of the list is pushed to the reserved level without which the word would be lost in the pushing down. When the control receives the LF signal it would generate another CA pulse and shift the words in the list back to the original positions while the incoming new word is rejected. An NS signal will be sent from the control to the interface INT5 for use by CP.

It should be noted that two or more data with the same address (same stack and key portion) can be stored simultaneously in the same list memory. Only the uppermost one, however, will be accessed by a read or fetch operation.

Figure 9:
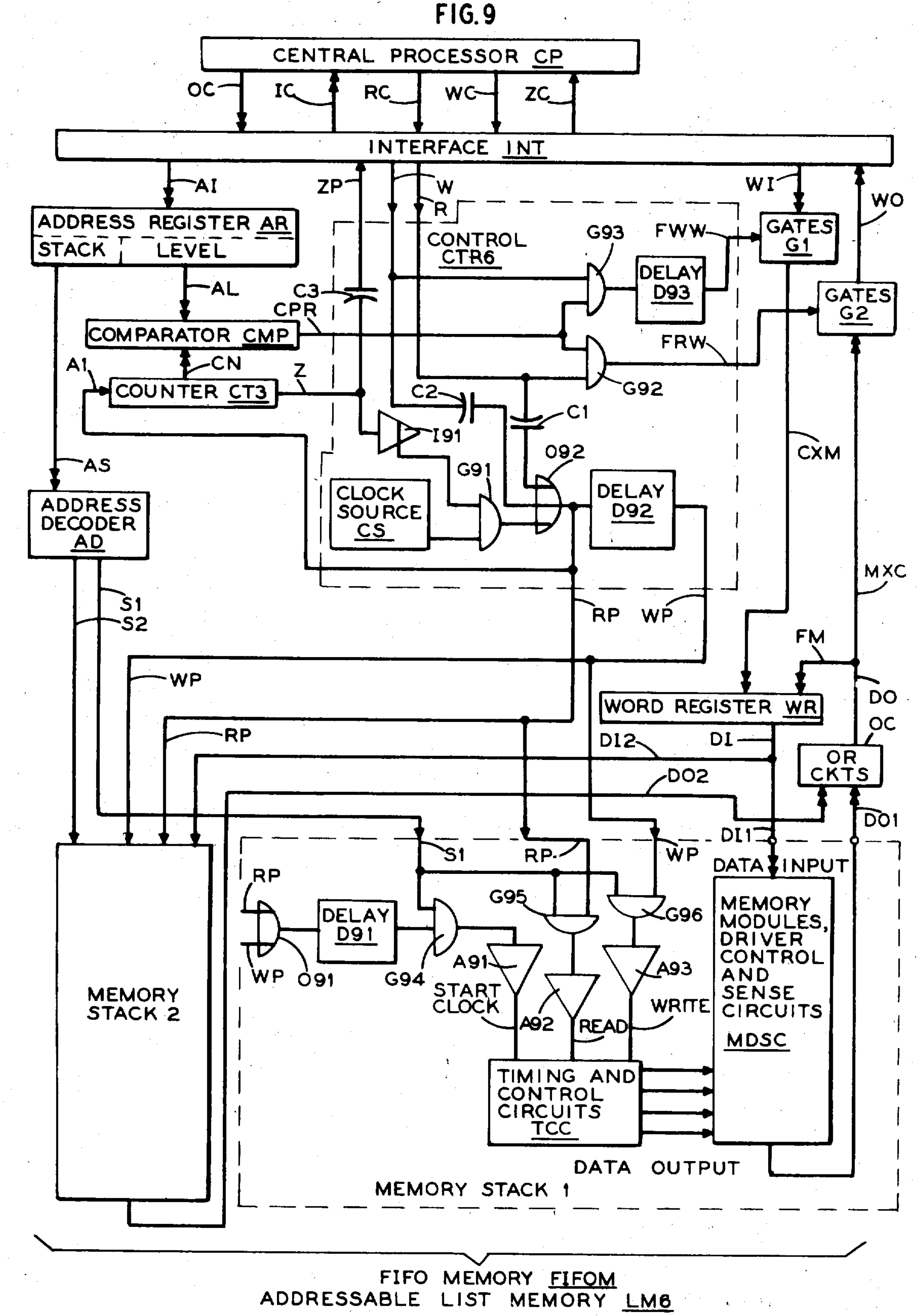
FIG. 9 shows a block diagram of a computer system employing an addressable list memory system having a FIFO-type list memory.

Another embodiment of the computer system is shown in FIG. 9 wherein the addressable list memory system LM6 is connected via interface INT with central processor CP. Since the memory system LM6 is in many respects similar to memory system LM of FIG. 1 the same reference characters will be used for identical elements (similar, but not identical elements will be reference characters suffixed by the numeral 6) and only the differences will be described in detail.

The prime difference is in the type of list memory used. Previously, the list memory was of the LIFO-type; now FIFO-type memories will be used.

The memory system LM6 centers around a pair of list memories of the FIFO (First-in/first-out) or queue type and associated access word registers. Functionally, a queue type list memory is a storage device which works as though it comprises a plurality of word register arrayed in a column with only the register at the top of the column being accessible to the rest of the system for reading and the first "free register" down the column for writing. For simplicity the first "free register" will be called the bottom of the column or the end of the queue. When words are serially read from the list, each word is taken in turn from the "top register" of the column and other data in the list move up from register to register to fill the vacant spaces, and when a word is put into the list, it enters the first "unoccupied register" down the column forming the end of the queue. If one assumes the list to be full, the registers can be visualized as a deck of cards wherein cards can only be put on the bottom of the deck and it is only possible to remove cards, one at a time, from the top of the deck.

The memory system LM6 comprises FIFO memory FIFOM having by way of example two queue-type lists or stacks. In order to locate any word in the memory FIFOM, the first part of an address specifies the stack and the second part specifies the level of the word in the stack as the number of registers below the top register of the stack. Returning to the deck of cards analogy, any card in two decks of cards can be specified by stating which deck the card is in (the first part of the address) and how many cards the desired card is below the top card of the deck.

Associated with memory FIFOM is the one word register WR which provides the interface between memory FIFOM and the remainder of the system. This register can be a one word flip-flop register whose previous contents are cleared each time a new word is inserted.

The memory system LM6 further includes an address register AR which receives a binary coded address word via lines AI from interface INT. The address register AR is as previously described for FIG. 1, as is address decoder AD. In the present example, since only two stacks are being used, the stack portion of the address will either be a binary "one" or a binary "zero" requiring only one input signal line. If a binary "zero" is present, a signal will be emitted onto line S1; if a binary "one" is present, a signal will be emitted on line S2.

The second portion of the address register AR, containing the level portion of the desired address, is fed via the AL signal lines to one side of comparator CMP. Comparator CMP is the same as that described with respect to FIG. 1. The comparator has a CPR signal present at its output only when an equality is detected. The other side of comparator CMP receives binary coded combinations of signals via lines CN from counter CT3.

Counter CT3 can be an up binary counter which accumulates a count of pulse signals, i.e. it unit adds to its accumulated count each time a pulse is received at its input. At any time, the accumulated count is represented by a binary coded combination of signals on the lines CN. The unit pulses are received on line A1. When the accumulated count is zero, the counter emits a Z signal.

Control CTR6, hereinafter more fully described, controls the overall operation of the memory system LM6 during reading and writing operations. The remaining elements are the gates G1 and G2. Each of the gates are parallel arrays of "and" circuits which control the flow of information from their information inputs to their information outputs under control of control signals at their control inputs. The OR circuits OC are a plurality of two input logical OR devices.

The operation of the computer system of FIG. 9 will now be described. All flip-flop registers are assumed cleared and the stacks of memory FIFOM may or may not contain information in some or all of its levels. A record or write operation will be described first, i.e. a word will be stored at a specific level of a specific stack indicated by an address selected by the central processor CP.

In particular, the central processor CP transmits the address word via the lines OC, the interface INT and the AI signal lines to the address register AR. Then, the central processor CP transmits the information word to be stored in the just specified address, via the lines OC to the one word register in the interface INT. Finally, the central processor CP transmits the WC signal (indicating a write operation) via the WC signal line to the interface INT from which it is transmitted as the W signal to the control CTR6. It should be noted that all the signals can be transmitted concurrently. Now the location of the desired address begins.

The stack portion of the address register AR is fed via the AS signal lines to the address decoder AD which starts generating either the S1 or S2 signal for selecting one of the stacks in the memory FIFOM. The counter CT3 contains a count of zero. The control CTR6 starts generating three periodically recurring sets of pulses which are in synchronism. One set of pulses is fed via the A1 signal line to the pulse input of counter CT3 for incrementing the counter. The other two sets of the pulses are fed via the RP and WP signal lines to memory FIFOM. The pulses are treated in triads of an A1 pulse signal, an RP and a WP pulse signal. Each RP pulse will cause the "top register" of memory FIFOM to be transferred via the DO1 signal lines, the OR circuits OC, the DO and FM signal lines to word register WR. Each WP pulse will cause the transfer of the contents of the word register WR being transferred via the DI signal lines to the "bottom register" thereof.

It should be realized that the triad of pulses occur in the following sequence, the A1 and RP pulses are substantially simultaneous and the WP pulse occurs shortly thereafter. Thus, counter CT3 is incremented by one at about the same time that the contents of "top register" of memory FIFOM is transferred to word register WR. Shortly thereafter, the contents of word register WR are transferred to the "bottom register" of memory FIFOM. Now, when the count in counter CT3 equals the address in address register AR comparator CMP feeds a CPR signal to control CTR6. After the contents of the "top register" are loaded in word register WR, control CTR6 emits a FWW signal which opens gates G1 causing the word stored in the one word register of interface INT to pass via lines WI and CXM into word register WR to replace the word just stored therein. Thus when the RP pulse occurs the word now present in word register WR is stored in the "bottom register" of memory FIFOM and the new word is stored in the desired address register.

It is now necessary to restore memory FIFOM to its home position. This is accomplished by continuing the generation of the triads of pulses which cause unit incrementing of counter CT3 and "ring-around" transfers until the count in counter CT3 is back to zero. At that time counter CT3 emits a Z signal to control CTR6 which stops generating the pulse triads. In addition, control CTR6 generates a ZP pulse signal which is fed via interface INT and the ZC signal line to central processor CP indicating the transfer has been completed and the memory system is available for another transaction.

The read operation wherein the contents of a desired address, specified by the central processor CP, are nondestructively read from memory system LM into the central processor CP is in many ways similar to the above described write operation. Therefore only the differences will be pointed out.

In particular, after the desired address is entered into the address register AR, the central processor CP transmits the RC signal to the interface INT which transmits an R signal to control CTR6 indicating a read operation. The unit incrementing of the counter CT3 and the address comparisons begin and continue as before. At the same time, the RP and WP pulses cause the previously described "ring-around" transfers in memory FIFOM. When equality is sensed by comparator CMP, the CPR signal is again generated. However, control CTR6 now transmits the FRW signal to gates G2 which open. When the RP pulse signal associated with the A1 pulse signal which caused the equality detection occurs, the contents of the "top register" of memory FIFOM is transferred to the word register WR in the usual manner, and also transferred via lines MXC, gates G2 and lines WO to the one word register in the interface INT. The associated WP pulse causes the contents of word register WR to be recorded in the "bottom" of memory FIFOM in the usual manner. It should be noted that after the FRW signal, the desired word will be ready in interface INT and the processor could then be notified without waiting for the list to return to the "home" position. Such a procedure would require a slightly more complicated control but would speed up operation of the memory.

The counter CT3 still counts and the "ring around" transfers continue as described above. When the Z signal is generated by the counter CT3, control CTR6 transmits the ZP pulse signal to the interface which sends the ZC signal to the central processor CP which instructs the processor that the one word register of the interface INT hold the desired word. The processor CP can then take the desired word from the interface via the lines IC.

The memory FIFOM and the control CTR6 will now be described in greater detail.

Memory FIFO comprises by way of example two identical stacks, memory stack 1 and memory stack 2. Memory stack 1 includes a plurality of domain tip propagation logic (DTPL) shift registers in a plurality of memory modules. These modules are driven by current drivers in response to timing and control signals. The outputs of the modules are picked up by sense circuits. These elements are included in unit MDSC. A complete description can be found in "Technical Report ECOM 01828–F Investigation for a First-in First-out Data Buffer Memory"—Final Report by Robert J. Spain and Claude P. Battarel, Aug. 1967, under contract DA 28–043–AMC–01828 (E) for U.S. Army Electronics Command, Fort Monmouth, N.J. The circuits enclosed in unit MDSC are shown in FIG. 64 (page 111) of the report. The timing and control circuits TCC are shown in FIG. 3 (page 110) of the report: The DATA INPUT and DATA OUTPUT signal leads of unit MDSC correspond to the same named leads of said FIG. 64, as do the START CLOCK, READ, and WRITE signal leads of circuits TCC correspond to the same named leads of FIG. 63.

The remainder of the circuitry of memory stack 1 interfaces the RP and WP signals to the circuits TCC, and controls stack selection. And gates G94, G95 and G96 are used in stack selection. Each has one input connected to the S1 signal line from address decoder AD. When the S1 signal is present indicating memory stack 1 has been selected for accessing, gates G94, G95 and G96 are open. When control CTR6 generates the RP signal it passes through gate G95 to amplifier A92 to become the READ signal for priming the stack 1 for a read cycle. When control CTR6 generates the WP signal it passes through gate G96 to amplifier A93 to become the WRITE signal for priming the memory stack 1 for a write cycle. Both the RP and WP signals also pass OR circuit O91, delay D91, and gate G94 to the amplifier A91 to become the START CLOCK signal which initiates the previously selected read or write cycle. The function of delay D91 is to insure that the read or write cycle is reliably selected before the cycle is initiated.

Memory stack 2 is identical to stack 1 except that the equivalents to gates G94, G95 and G96 receive the S2 signal instead of the S1 signal.

The control CTR6 primary generates the A1, RP and WP pulse signals for cycling the memory. All but the first of these pulses are derived from clock pulse source CS (a free running pulse generator). The output of clock pulse source CS is connected to one input gate G91 whose other input is connected to the output of inverting amplifier I91 which receives the Z signal from counter CT3. Therefore, as long as counter CT3 does not contain a zero count the pulses from source CS pass via gate G91, and OR circuit O92 to become RP pulses. It should be noted that at a start of an access operation, counter CT3 does contain zero. Therefore, to obtain the first A1, RP and WP pulses for a read operation, a second input of OR circuit O92 is connected, via differentiator C1, to the R signal line, similarly to obtain these first pulses for a write operation, the third input of OR circuit O92 is connected via differentiator C2 to the W signal line. The output of OR circuit O92 is connected to the A1 signal line, the RP signal line and the input of delay D92. For each pulse emitted by OR circuit O92, there is a pulse emitted a given time thereafter from the delay D92. The output of delay D92 is connected to the WP signal line.

Gates G92 and G93 control the operation of gates G1 and G2. The inputs of gate G92 are connected to the R and CPR signal lines, and the output of gate G92 is connected to the FRW signal line. Therefore, during a read operation (indicated) by the R signal) when the desired level is found (indicated by the CPR signal) gate G92 emits the FRW signal which opens gates G2.

The inputs of gate G93 are connected to the W and CPR signal lines. During a write operation (indicated by the W signal) when the desired level address is found (indicated by the CPR signal) gate G93 emits a pulse which passes through delay D93 to become the FWW signal which opens gates G1. The delay is long enough to insure that word register WR has received the word from memory FIFOM which is to be replaced. Finally, the Z signal line is connected via differentiator C3 to the ZP signal line so that when counter CT3 steps to zero and starts generating a long term Z signal, the starting edge of this signal is used to notify processor CP that the operation has terminated.

Figure 10:
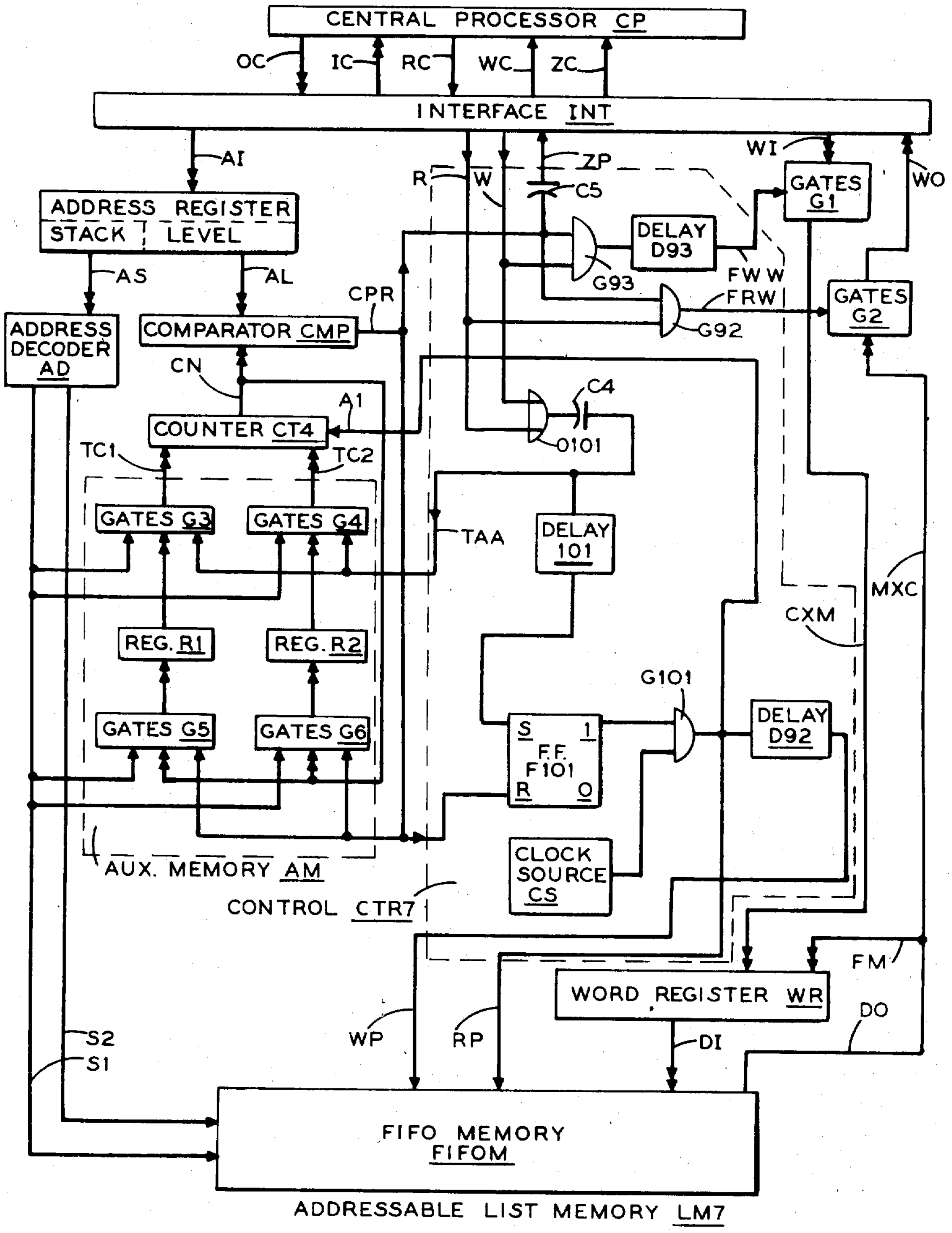
FIG. 10 shows a variation of the embodiment of FIG. 9.

In FIG. 10, there is shown a variation of the system of FIG. 9. The main difference is that it is not necessary to restore the counter and the selected stacks to a home or zero position after having accessed the stack. Instead, the contents of the counter is stored in an auxiliary memory register associated with that stack and the stack remains in its last position. Therefore, the auxiliary memory register stores the address of the first available register of the stack. The next time that stack is called for, the contents of its associated auxiliary memory register are transferred to the counter and the address location operation proceeds from that point. Since most of the elements are the same as those for the system of FIG. 9, the same reference characters will be used for like elements, and only the differences will be cited. In particular, there is included an auxiliary memory AM, a different control CTR7, and the counter CT4 is a presettable binary counter modulo N, where N is the number of registers in the list memory.

At the start of any read or write operation, the usual address word is sent to the address register AR to select the level and the stack. The S1 or S2 signal cooperates with TAA signal, derived from the R or W signal in control CTR7, to transmit the address of the then available level of the selected stack to counter CT4. Thereafter the usual triads of A1, RP and WP pulse signals are generated. The usual "ring-around" transfers in memory FIFOM and the usual incrementing of the counter CT4 occur. When the desired level is located, comparator CMP emits its usual CPR signal resulting in the desired transfer of a word between the register in the interface INT and the memory FIFOM followed by the immediate termination of the operation. At that time, a particular level is available in the selected stack and counter CT4 stores the number associated with that particular level. The CPR signal is also fed to auxiliary memory AM where it cooperates with the then present S1 or S2 signal to gate the contents of counter CT4, represented by signals on the CN signal lines back into the associated register in memory AM.

Auxiliary memory AM comprises a plurality of registers. Each of the registers is permanently assigned to one of the stacks of memory FIFOM. As shown, flip-flop register R1 is assigned to stack 1 and register R2 to stack 2. Register R1 is loaded via gate G5 by signals on the CN signal lines under control of the S1 and CPR signals. The contents of register R1 are fed, via lines TC1 to counter CT4, under control of the S1 and TAA signals. Similarly, for register R2 except that the S1 signal is replaced by the S2 signal. While the registers have been disclosed as flip-flop registers, it may be more desirable when the number of stacks is large to use a core memory array of registers.

Control CTR7 differs from control CTR6 of FIG. 9 in means for generating the A1, RP and WP pulse signals and with the generation of the TAA signals. Since this portion of the circuitry operates the same for a read or write operation, only the read operation will be described. When a read operation is called for, the R signal passes via OR circuit 0101 and differentiator C4 to become the TAA signal which gates out the selected available address in auxiliary memory AM. In addition, this pulse passes through delay D101 to the set input of flip-flop F101. The delay is such that the counter CT4 is loaded before the flip-flop sets. With the flip-flop set, it transmits a signal to one input of gate G101 which opens. The pulses from the clock pulse source CS connected to the second input of gate G101 pass therethrough to the RP signal line and to the A1 signal line, and via delay D92 to the WP signal line. In this manner the required triads of pulses are generated.

The CPR signal, generated by the comparator CMP when the desired address is located, is fed to the reset input of flip-flop F101. When this occurs, gate G101 is blocked and no further A1, RP and WP pulses are generated. In addition, CPR signal passes via differentiator C5 to become the usual ZP pulse fed to interface INT.

Figure 11:
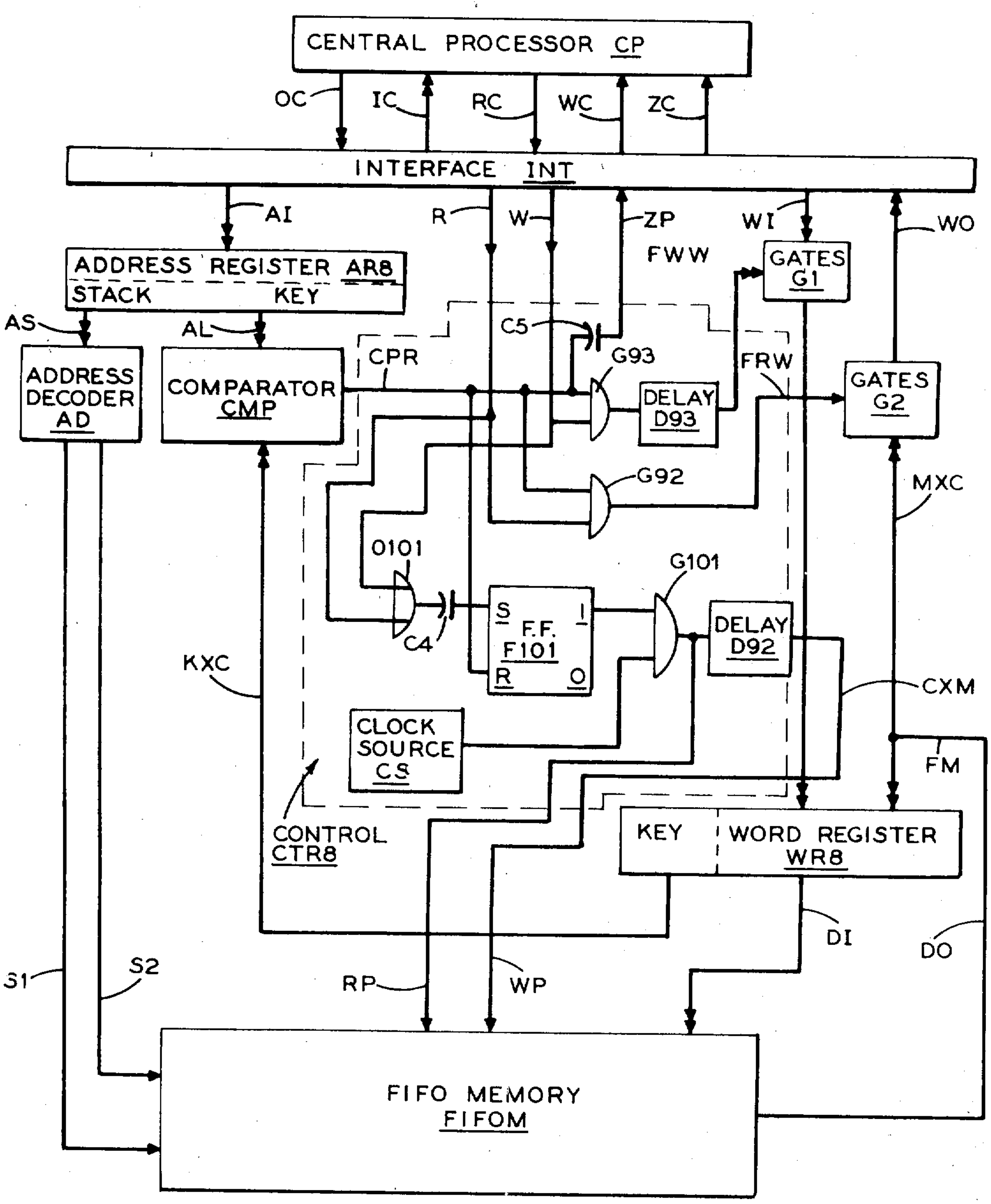
FIG. 11 shows a contents addressable variation of the embodiment of FIG. 9.

In FIG. 11 there is shown a contents addressable embodiment of the invention for a FIFO type memory. The computer system of FIG. 11 comprises the central processor CP connected via interface INT to the addressable list memory system LM8, hereinafter called memory system LM8.

Memory system LM8 is most similar to memory system LM6 of FIG. 9. Therefore, the same reference characters will indicate identical elements; similar, but not identical elements will bear reference characters suffixed by the numeral 8. Furthermore, only the differences will be described in detail.

The fundamental difference is that memory system LM8 is content addressable while memory system LM6 is position addressable.

Therefore, address register AR8 has a stack portion and a key portion. There is no level number in the address, so there is no need for a counter. Instead the comparator CMP compares the desired key with "available" keys. Now each word in the memory has associated with it a key. Accordingly, each of the shift registers in the stacks includes extra bit positions for holding the keys in parallel with the associated words. In other words, each word now includes a data portion and a key portion. Hereinafter, unless otherwise specified, a word will imply both portions. Therefore, word register WR8 is expanded to handle all two portions.

With this in mind, the differences in the operation of memory system LM8 with respect to memory system LM6 will be described. In fact, the prime difference is that during a read or write operation, as a word undergoes a "ring-around" transfer via word register WR8, its key portion is also transferred from word register WR8 via lines KXC to comparator CMP where it is compared with the desired key from the key portion of address register AR8. These transfers and comparisons continue until equality is sensed as indicated by the transmission of a CPR signal from comparator CMP to control CTR8. The read or write operation then occurs and the operation terminates as in the system of FIG. 10. The prime difference between control CTR8 and control CTR7 is in the generation of the cycling pulses. In particular, either the R or W signals from interface INT pass through OR circuit O101 and differentiator C4 to set flip-flop F101. With the flip-flop set, the signal from its "1" output opens gate G101 so that the pulses from clock source CS pass therethrough to become the RP pulses and after a delay by delay device D92 to become the WP pulses. When the desired register is found, the CPR signal resets the flip-flop F101 terminating the generation of these pulses. It should be noted that the generation of the FWW, FRW and ZP signals is the same as previously described and will not be repeated. In order to prevent an infinite search during a reading operation when a desired key is not found in the stack, a counter can be included to count WP pulses. The counter can be cleared at the start of each access operation and if the count exceeds the number of registers in the stack an error signal can be generated.

It should be noted that analogous to memory system LM4 the key portion of an address can be written along with the data portion when the word is entered into the memory.

Since the various elements shown in the system are made up of standard components and standard assemblies, reference may be had to "High Speed Computing Devices," by the staff of engineering Research Associates, Inc. (McGraw-Hill Book Company, Inc., 1950); and appropriate chapters in "Computer Handbook" (McGraw-Hill, 1962) edited by Harry D. Huskey and Granino A. Korn, and for detailed circuitry to the text "Principles of Transistor Circuits," edited by Richard F. Shea, published by John Wiley and Sons, Inc., New York, and Chapman and Hall, Ltd., London, 1953 and 1957. In addition, other references are: For system organization and components: "Logic Design of Digital Computers," by M. Phister, Jr. (John Wiley and Sons, New York); "Arithmetic Operations in Digital Computers" by R. K. Richards (D. VanNostrand Company, Inc., New York). For circuits and details: "-Digital Computer Components and Circuits." R. K. Richards (D. VanNostrand Company, Inc., New York).

Especially worthwhile books for finding the components mentioned in the specification, and the hardware for realizing the components as well as the techniques for interconnecting the elements are: "Digital Logic Handbook," 1968 edition, copyrighted in 1968 by the Digital Equipment Corporation of Maynard, Mass., and "Digital Small Computer Handbook," 1968 edition, having a similar copyright.

While only a limited number of embodiments of the invention have been shown and described in detail, there will now be obvious to those skilled in the art, many modifications and variations satisfying many or all of the objects of the invention without departing from the spirit thereof as defined in the appended claims.

1. A memory system which is accessible for the operations of reading or writing words comprising at least one main list memory means of the pushdown type for storing a plurality of words and at least one auxiliary list memory means of the pushdown type for storing a plurality of words, only said main list memory means storing words at the start of a reading or writing operation, address register means for storing the address of a desired word, first transfer means for sequentially transferring words from said main list memory means to said auxiliary list memory means, available address indicating means for indicating the address of each word as it is being so transferred, comparator means for comparing the address of a desired word stored in said address register means and the address being indicated by said available address indicating means for signaling when a particular relationship exists between the addresses being compared, means responsive to the signaling 2. The memory system of claim 1 wherein the stored words include key portions and said available address indicating means includes means for indicating the available address in accordance with a key portion of each of the words being sequentially transferred.

3. The memory system of claim 2 wherein said comparator means includes means for indicating an equality between said key portions and the address stored in said address register means.

4. The memory system of claim 1 wherein said main list memory means includes a plurality of word register levels, said address register means stores a level number, said available address indicating means includes a counter means which is unit incremented each time a word is transferred from said main list memory means to said auxiliary list memory means for indicating the number of the then available level, and said comparator means senses for a given relationship between the level numbers indicated by said counter means.

5. A memory system which is accessible for the operations of reading or writing words comprising at least one mean list memory means of the pushdown type including $2n$ register levels for storing words, where $n$ is an integer, at least one auxiliary list memory means of the pushdown type including $2n$ register levels for storing words, address register means for storing a number representing a desired level between 1 and $2n$, controllable transfer means for sequentially transferring words in a first direction from said main list memory means to said auxiliary list memory means or in a second direction from said auxiliary list memory means to said main memory means, counter means counting at least the number of transfers between said list memory means during a reading or writing operation for storing a number representing the available level of at least one of said list memory means, comparator means for comparing the number stored in said address register means and the number stored in said counter means and for signalling when a particular relationship exists between said numbers being compared, access control means responsive to the signaling of said comparator means for causing the reading of a word from or the writing of a word into the then available level of one of said list memory means, and direction control means for controlling said controllable transfer means to transfer words in one of said directions.

6. The memory system of claim 5 wherein said counter means includes means for indicating when at least $n$ transfers in one of said directions occur between said list memory means before the desired level is accessed, and said control means including means responsive at least to said indicating means of said counter means for controlling said controllable transfer means to continue transfers in said one direction until the words of all $2n$ levels of the source list memory means are stored in the receiving list memory means associated with said one direction of transfer or to cause transfer in the other of said directions until the words of all $2n$ levels are stored in said source list memory means after said desired level is accessed in accordance with whether or not said indicating means of said counter means indicates that at least $n$ transfers in said one of said directions had occurred before said desired level was accessed.

7. The memory system of claim 6 further including means for indicating when the words of all $2n$ levels are transferred to one of said list memory means.

8. The memory system of claim 6 further including means for remembering which of said list memory means is storing the words.

9. The memory system of claim 6 wherein said counter means is presettable to different count values and is controllable to incrementally or decrementally count, said comparator means includes means for indicating the equality of the two numbers being compared and also which of the numbers is the greater, further control means for rendering said access control means operative when said comparator means indicates an equality of the numbers being compared, and said direction control means responsive to said comparator means for controlling said controllable transfer means to transfer words in a direction determined by which of the two numbers being compared is the greater, and further comprising means responsive to the signaling of said comparator means to cause said counter means to unit increment or unit decrement during the transfer of words between said list memory means as determined by which of the two numbers being compared is the greater and means for presetting said counter means at the start of each read or write operation.

10. The memory system of claim 9 further including means for transmitting to said presetting means a number related to the count stored in said counter means when said comparator means indicates an equality of the numbers being compared.

11. A memory system which is accessible for the operations of reading or writing words comprising at least one first-in, first-out list memory means of the queue type for storing a plurality of words, said list memory means having a word input and a word output, address register means for storing the address of a desired word, transfer means for sequentially transferring words from said word output of said list memory means to said word input of said list memory means, available address indicating means for indicating the address of each word as it being so transferred, comparator means for comparing the address of the desired word stored in said address register means and the address being indicated by said available address indicating means for signaling when a particular relationship exists between the addresses being compared, and means responsive to the signaling of said comparator means for causing the reading of a word from or the writing or a word into one of said list memory means.

12. The memory system of claim 11 wherein the stored words including key portions and said available address indicating means includes means for indicating the available address in accordance with a key portion of each of the words being sequentially transferred.

13. The memory system of claim 11 wherein said main list memory means includes a plurality of word register levels, said address register means stores a level number, said available address indicating means includes a counter means which is unit incremented each time a word is transferred from said word output of said list memory means for indicating the number of the then available level, and said comparator means senses for a given relationship between the level number stored in said address register means and the level numbers indicated by said counter means.

14. The memory system of claim 13 wherein said levels have an initial order, and further comprising means for restoring said levels to said initial order after said comparator senses said given relationship.

15. The memory system of claim 13 further comprising means storing the count of said counter means after said comparator means senses said given relationship for subsequent presetting said counter means to said count at the start of another operation of reading or writing.

16. A memory system comprising at least one main list memory means having a plurality of interconnected registers for storing a plurality of words and at least one auxiliary list memory means having a plurality of interconnected registers for storing a plurality of words, means for indicating a desired word address, means for sequentially transferring words between said main list memory means and said auxiliary list memory means, means for indicating an address for each word being transferred between said memory means, means for indicating when a predetermined relationship exists between the desired word address and the address of the word being transferred, register means, and means responsive to said relationship indicating means for effecting a transfer of a word between said register means and one of said list memory means.

17. The memory system of claim 16 wherein said means responsive to said relationship indicating means includes means for reading a word from one of said list memory means and transferring said word to said register means.

18. The memory system of claim 16 wherein said register means includes a source of words and said means responsive to said relationship indicating means includes means for receiving a word from said source of words and for recording said word into one of said list memory means.

19. The memory system of claim 16 further comprising another main list memory means and means for selecting one of said main list memory means to cooperate with said one auxiliary list memory means during the sequential word transfers.

20. The memory system of claim 16 wherein at least one of said list memory means is a last-in, first-out pushdown type list memory.

21. The memory system of claim 16 wherein each of said list memory means is a last-in, first-out pushdown list memory.

UNITED STATES PATENT OFFICE

CERTIFICATE OF CORRECTION

Patent No. 3,601,809 Dated August 24, 1971

Inventor(s) Harry J. Gray et al

It is certified that error appears in the above-identified patent and that said Letters Patent are hereby corrected as shown below:

On the cover sheet, [73] the Assignee "The Trustees of the University of Pennsylvania, Philadelphia, Pa." should read -- Research Corporation, New York, New York, --. Column 2, line 50, "("popped-up"" should read -- ("popped-up") --; line 66, "in", first occurrence, should read -- is --. Column 3, line 59, "Al" should read -- AI --; line 70, "Ad" should read -- AD --. Column 5, line 61, "53" should read -- 58 --; line 67, cancel "by"(first occurrence) . Column 10, line 2, "FEM" should read -- FRW --. Column 11, line 17, "portion" should read -- portions --; line 61, symbol at beginning of line should read -- " --; line 72, "viz" should read -- viz. --. Column 12, line 15, "spaced" should read -- space --; line 30, "spaced" should read -- space --. Column 13, line 1, "register" should read -- registers --. Column 15, line 10 "hold" should read -- holds --. Column 16, line 8, cancel ")", first occurrence. Column 18, line 7, "engineering" should read -- Engineering --; line 51, after "signaling" should read -- of said comparator means for causing the reading of a word from or the writing of a word into one of said list memory means, and means responsive to the signaling of said comparator means for transferring all words stored in said auxiliary list memory means back to said main list memory means. --; line 72, "mean" should read -- main --.

Column 1, line 5, after "filed April 23, 1968" should read -- , now abandoned --. Column 3, line 39, "output" should read -- input --. Column 4, line 60, "CT" should read -- CTR --. Column 5, line 60, after "50" should read -- and 52 --. Column 7 line 75, "ALM" should read -- ALM1 --. Column 8, line 14, "CTR1" should read -- CT1 --; line 51, "CTR1" should read -- CT1 --. Column 9, line 21, "refer" should read -- referring --. Column 15, line 30, "Fig. 3" should read -- Fig. 63 --. Column

UNITED STATES PATENT OFFICE
CERTIFICATE OF CORRECTION

Patent No. 3,601,809 Dated August 24, 1971

Inventor(s) Harry J. Gray et al Page 2

It is certified that error appears in the above-identified patent and that said Letters Patent are hereby corrected as shown below:

20, line 13, "including" should read -- include --; line 33, "subsequent" should read -- subsequently --. In the drawings, Fig. 5 on Sheet 4, the designation "FWR" should read -- FRW --. Fig. 10, Sheet 9, redraw the leads which connect lead S1 to gates G4 and gates G6, respectively, so that these leads terminate at the lead S2 rather than S1.

Signed and sealed this 21st day of November 1972.

(SEAL)
Attest:

EDWARD M.FLETCHER,JR.
Attesting Officer

ROBERT GOTTSCHALK
Commissioner of Patents